E. A. DE MERS.
VAPOR CONTROLLING VALVE FOR INTERNAL COMBUSTION ENGINES.
APPLICATION FILED MAY 22, 1917.

1,266,422.

Patented May 14, 1918.

WITNESSES:
Fred A. Tew.
E. Peterson

INVENTOR:
Edgar A. DeMers
BY
Pierre Barnes
ATTORNEY

UNITED STATES PATENT OFFICE.

EDGAR A. DE MERS, OF SEATTLE, WASHINGTON.

VAPOR-CONTROLLING VALVE FOR INTERNAL-COMBUSTION ENGINES.

1,266,422.   Specification of Letters Patent.   Patented May 14, 1918.

Application filed May 22, 1917. Serial No. 170,135.

*To all whom it may concern:*

Be it known that I, EDGAR A. DE MERS, a citizen of the United States, residing at Seattle, in the county of King and State of Washington, have invented certain new and useful Improvements in Vapor-Controlling Valves for Internal-Combustion Engines, of which the following is a specification.

This invention relates to valves which are designed, more especially, for use with internal combustion engines to regulate the admission of vapor, steam or air into the intake manifold of an internal combustion engine.

The object of my invention is the provision of a valve suitable for the above-named purpose which will be of simple and inexpensive construction, easy to operate and efficient in action.

With these ends in view, the invention consists in the novel construction, arrangement and combination of parts, as will be hereinafter described and claimed.

Figure 1:
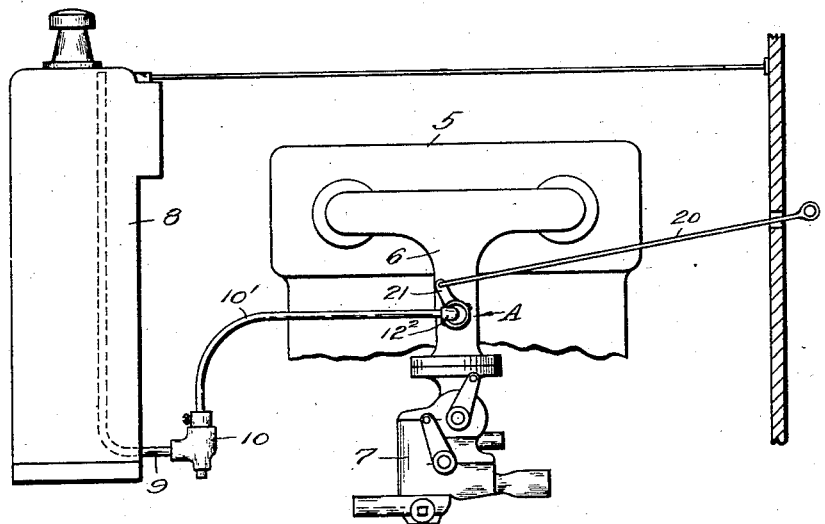
Figure 3:
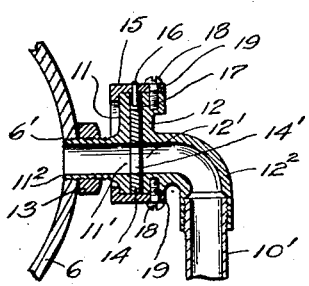
Figure 4:
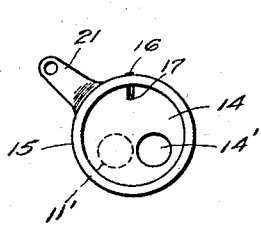
Figure 2:
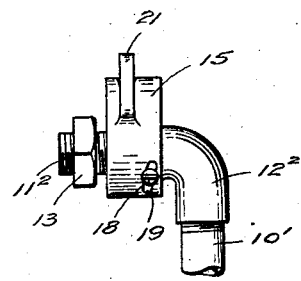

In the accompanying drawings, Figure 1 is a view in side elevation of my improved valve shown applied to an automobile engine. Fig. 2 is a plan view of the valve shown detached. Fig. 3 is a transverse section of the same. Fig. 4 is a front elevation with one of the non-rotatable members omitted.

Referring to the drawings, the numeral 5 designates the cylinders of an automobile engine having an intake manifold 6 leading thereinto from a carbureter 7, and 8 represents the radiator associated with said engine.

Extending from the space above the water level in said radiator is a so-called overflow pipe 9 which, in this instance, is connected by a T-fitting 10 and tube $10^1$ with said intake manifold, and included in such connection is a valve, indicated generally by A in Fig. 1, embodying the present invention.

The valve in my invention comprises two disks members 11 and 12 having ports $11^1$ and $12^1$ arranged in axial alinement with each other and eccentric with respect to the axis of the disks. The port $11^1$ of one disk constitutes the end of a passage extending through a nipple element $11^2$ integral with and extending right-angularly from the disk 11.

The port $12^1$ of the other disk constitutes the end of a passage provided in elbow $12^2$ which is integral with the disk and having its outer end directed right-angularly, or nearly so, from the disk axis.

The nipple $11^2$ is externally screw-threaded to engage in a threaded hole $6^1$ (Fig. 3) of said manifold. A lock nut 13 provided on the nipple thread and engaging the manifold 6 is employed to prevent the disk 11 from rotating.

The elbow opening, as shown, is interiorly screw-threaded to receive an end of the tube $10^1$ and whereby the disk 12 is prevented from rotating.

14 represents a circular plate interposed between the aforesaid disks, and is provided with a port $14^1$ which may be brought into register with the ports $11^1$ and $12^1$ by suitably rotating the plate. The disks 11, 12 and plate 14 are surrounded by an annular casing member 15 which is rotatably coupled to said plate, as by means of a pin 16 projecting from said member into a notch 17 in the plate. Both disks and the plate are confined between an inwardly extending peripheral flange $15^1$ provided at one end of the casing member and two screws 18 extending through slots 19 of the casing member to engage in threaded holes provided at diametrically opposite sides of the disk 12.

The slots 19 are, however, disposed in helical relation to the axis of the valve so that when the casing is turned in one rotary direction or the other, the disk 12 will be moved axially inward or outward with respect to the casing to effect, respectively, the clamping of the plate 14 by the two non-rotatable disks or their relative separation.

The regulating screws 18 and slots 19 are arranged in such relations with respect to the port $14^1$ that the disks clamp the plate as communication is being established between the plate port and the disk ports.

To open and close the valve, I employ an operating rod 20 (Fig. 1) connected from one end to an arm 21 rigid with the casing member 15 and having its other arm extend to within convenient reach of the operator.

In operation, the disks 11 and 12 are brought into juxtaposition with the plate 14 when the several ports are out of register, whereby the communication between the ports 11¹ and 12¹ is stopped.

The invention will be understood from the foregoing description.

What I claim, is—

1. The combination with the intake manifold of an internal combustion engine, of a valve connected therewith, said valve having a rotary plate interposed between two non-rotatable disk members, ports provided in said plate and disk members, and an annular casing member surrounding and connected to said plate and disk members so as to rotate the former and afford axial movements to the latter.

2. The combination with the intake manifold of an internal combustion engine, of a valve comprising a disk member secured to said manifold, a second disk member secured against rotation in axial alinement with the aforesaid disk, alined ports provided in said members and in eccentric relation to the axes thereof, a circular plate interposed between said disk members and provided with a port, a casing member surrounding said disk members and the plate and rotatably connected to the latter, and means for coupling said disk members to the casing member so that by rotating the casing member said plate is rotated to present the port thereof into or out of register with the ports of the disk members and respectively cause the latter to separate from or engage against said plate.

Signed at Seattle, Wash., this 17th day of May, 1917.

EDGAR A. DE MERS.

Witnesses:
PIERRE BARNES,
E. PETERSON.

Copies of this patent may be obtained for five cents each, by addressing the "Commissioner of Patents, Washington, D. C."